Patented Feb. 25, 1936

2,032,110

UNITED STATES PATENT OFFICE 2,032,110

STABLE SOLID DIAZO-SALTS AND PROCESS OF MAKING SAME

Gérald Bonhôte, Basel, Switzerland, assignor to Society of Chemical Industry in Basle, Basel, Switzerland No Drawing. Application September 14, 1934, Serial No. 744,093. In Switzerland September 25, 1933

11 Claims. (Cl. 260—69)

The aromatic amines which correspond to the general formula

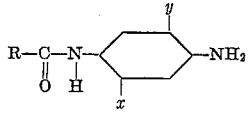

wherein R stands for phenoxymethyl, and $x$ and $y$ stand for a substituent selected from a group of substituents consisting of halogen, alkyl or alkoxy, have acquired importance as diazotizing components for the production of such azo-dyestuffs which are obtained by coupling arylides of 2,3-hydroxy-naphthoic acid or 2,3-hydroxyanthracene carboxylic acids with suitable diazo-compounds. The diazotization of the amines which lead to such diazo-compounds is not always an easy operation, so that it becomes necessary, in order to facilitate the operation of dyeing or printing, to use diazo-preparations instead of the diazotized base. Such diazo-preparations are usually made by precipitating the diazo-compound from its solution by means of a metal salt capable of giving a complex compound, or by means of an aromatic sulfonic acid.

It has now been found that the diazo-compounds which correspond to the above bases, when separated without aid of stabilizing agents, are surprisingly extraordinarily stable so that they may successfully be used as such for the production of solid diazo-preparations, for example, by addition of sodium sulfate, aluminium sulfate, or a sodium phosphate, etc. The separation of the diazo-compound can advantageously be carried out by salting out the diazo-solution produced in known manner. In many cases, particularly if in the above general formula R stands for aryl, it is advantageous to carry out the operation in not too dilute a solution, very good yields being thus obtained.

The new dry diazo-preparation contains the diazo-salts of the general formula

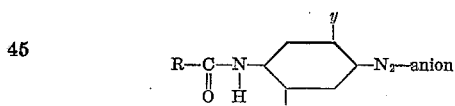

wherein R, $y$ and $x$ have the meaning already explained above, and anion is the radical of a mineral acid, such as Cl, Br, $SO_4H$, $NO_3$, etc. These products form white, pale yellow to yellow powders, dissolving in pure water with formation of solutions which are immediately ready for use. Therefore they form already as such valuable diazo-preparations whose properties may be improved by addition of the above cited products, such as sodium sulfate or aluminium sulfate.

The following examples illustrate the invention, the parts being by weight, and the parts by weight and the parts by volume being related to each other in the manner of the kilogram to the litre:—

Example 1

64 parts of 4-(1'-methyl)-phenoxyacetylamino-2,5-dimethoxy-1-aminobenzene are finely powdered and thoroughly stirred with 1000 parts by volume of water at room temperature. 15 parts of sodium nitrite are then added and, in the course of half-an-hour, 60 parts by volume of hydrochloric acid of 30 per cent. strength are dropped into the mixture. Diazotization occurs while the amine dissolves. The filtered diazo-solution is mixed with 100 grams of common salt. The hydrochloride of 4-(1-methyl)-phenoxacetylamino-2,5-dimethoxy-1-diazo-benzene of the formula

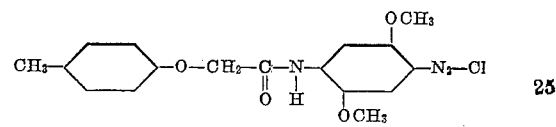

separates in the form of yellow crystals; it is filtered and dried at 40° C. If desired, it can be mixed even before it is dry, that is to say while still moist, with any of the auxiliary substances usual in the dyeing industry or with a suitable diluent. The yellow crystals of the hydrochloride are very freely soluble in water to form a neutral solution.

Example 2

66 parts of 4-(1'-methyl)-phenoxyacetylamino-2,5-diethoxy-1-aminobenzene are diazotized in the manner described in Example 1. The hydrochloride of the diazotized base is completely precipitated in the form of pale yellow crystals by means of a little common salt, filtered and, if desired, dissolved in lukewarm water, and the solution filtered from any slimy residue. On addition of a little common salt to the filtered solution the diazonium hydrochloride is precipitated in very good yield.

The operation is similar when starting from phenoxyacetylamino-2,5-dimethoxy- or diethoxy-1-aminobenzene, or 4-(1'- or 2'- or 3'-chloro)-phenoxy-acetylamino-2,5-dimethoxy- or diethoxy-1-aminobenzene.

Instead of the 4-(1'-methyl)-phenoxy compounds there may also be produced the corresponding 2'- and 3'-methyl-phenoxy compounds or the 1'-methoxy- or 1'-ethoxy-phenoxy compounds. The sulfates produced in analogous manner are more sparingly soluble than the corresponding chlorides.

What I claim is:—

1. Process for the manufacture of stable solid dry diazo-salts, consisting in diazotizing in a first step an amine of the general formula

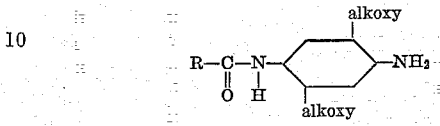

wherein R stands for a phenoxymethyl radical, with aid of a nitrite and an acid, precipitating in a second step the formed diazo-compound by addition of a salt of an inorganic acid, and filtering and drying in a third step the precipitated diazo-compound.

2. Process for the manufacture of stable solid dry diazo-salts, consisting in diazotizing in a first step an amine of the general formula

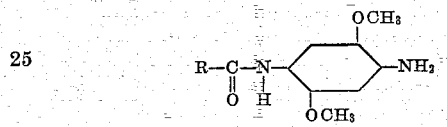

wherein R stands for a phenoxymethyl radical, with aid of a nitrite and an acid, precipitating in a second step the formed diazo-compound by addition of a salt of an inorganic acid, and filtering and drying in a third step the precipitated diazo-compound.

3. Process for the manufacture of stable solid dry diazo-salts, consisting in diazotizing in a first step an amine of the general formula

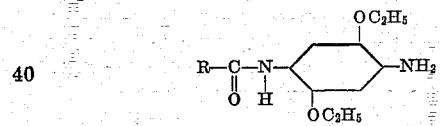

wherein R stands for a phenoxymethyl radical, with aid of a nitrite and an acid, precipitating in a second step the formed diazo-compound by addition of a salt of an inorganic acid, and filtering and drying in a third step the precipitated diazo-compound.

4. The stable solid diazo-salts of the formula

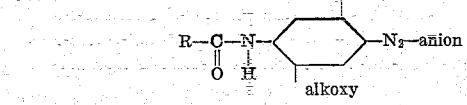

wherein R stands for a phenoxymethyl radical, and anion represents the radical of a mineral acid, which products form pale yellow to yellow powders, dissolving in pure water with formation of solutions which couple with alkali metal salts of arylides of 2,3-hydroxy-naphthoic acid with formation of dyestuffs.

5. The stable solid diazo-salts of the formula

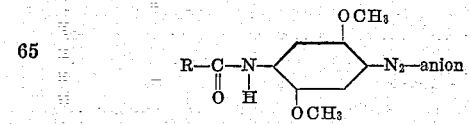

wherein R stands for a phenoxymethyl radical, and anion represents the radical of a mineral acid, which products form pale yellow to yellow powders, dissolving in pure water with formation of solutions which couple with alkali metal salts of arylides of 2,3-hydroxynaphthoic acid with formation of dyestuffs.

6. The stable solid diazo-salts of the formula

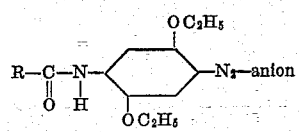

wherein R stands for a phenoxymethyl radical, and anion represents the radical of a mineral acid, which products form pale yellow to yellow powders, dissolving in pure water with formation of solutions which couple with alkali metal salts of arylides of 2,3-hydroxynaphthoic acid with formation of dyestuffs.

7. The stable solid diazo-salts of the formula

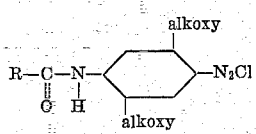

wherein R stands for a phenoxymethyl radical, which products form pale yellow to yellow powders, dissolving in pure water with formation of solutions which couple with alkali metal salts of arylides of 2,3-hydroxynaphthoic acid with formation of dyestuffs.

8. The stable solid diazo-salts of the formula

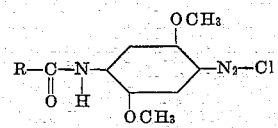

wherein R stands for a phenoxymethyl radical, which products form pale yellow to yellow powders, dissolving in pure water with formation of solutions which couple with alkali metal salts of arylides of 2,3-hydroxynaphthoic acid with formation of dyestuffs.

9. The stable solid diazo-salts of the formula

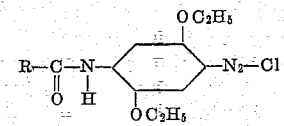

wherein R stands for a phenoxymethyl radical, which products form pale yellow to yellow powders, dissolving in pure water with formation of solutions which couple with alkali metal salts of arylides of 2,3-hydroxynaphthoic acid with formation of dyestuffs.

10. The stable solid diazo-salt of the formula

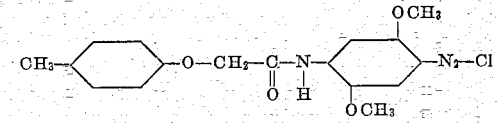

which is a pale yellow powder dissolving in pure water with formation of solutions which couple with alkali metal salts of arylides of 2,3-hydroxynaphthoic acid with formation of dyestuffs.

11. The stable solid diazo-salt of the formula

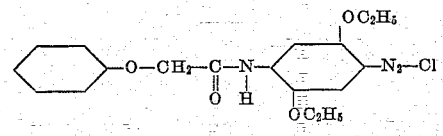

which is a pale yellow powder dissolving in pure water with formation of solutions which couple with alkali metal salts of arylides of 2,3-hydroxynaphthoic acid with formation of dyestuffs.

GÉRALD BONHÔTE.